United States Patent [19]

Okuno et al.

[11] Patent Number: 4,833,612
[45] Date of Patent: May 23, 1989

[54] CONSTANT SPEED CONTROL FOR A MOTOR VEHICLE

[75] Inventors: Itaru Okuno; Nagahisa Fujita; Tadashi Kaneko, all of Hiroshima, Japan

[73] Assignee: Mazda Motor Corporation, Hiroshima, Japan

[21] Appl. No.: 32,236

[22] Filed: Mar. 31, 1987

[30] Foreign Application Priority Data

Apr. 1, 1986 [JP] Japan .................................. 61-74707

[51] Int. Cl.$^4$ ............................................. B60K 31/00
[52] U.S. Cl. ............................ 364/426.04; 364/424.1; 180/179; 123/352
[58] Field of Search ................... 364/426.04, 431.07, 364/424.1; 180/175, 176, 179; 123/352, 360, 361, 376

[56] References Cited

U.S. PATENT DOCUMENTS

| | | | |
|---|---|---|---|
| 3,766,367 | 10/1973 | Sumiyoshi et al. | 180/176 |
| 3,886,915 | 6/1975 | Taplin | 180/179 |
| 4,421,192 | 12/1983 | Ito et al. | 180/179 |
| 4,467,428 | 8/1984 | Caldwell | 364/431.07 |
| 4,506,752 | 3/1985 | Hara et al. | 180/179 |
| 4,660,672 | 4/1987 | Katou | 180/175 |
| 4,698,762 | 10/1987 | Moriya et al. | 180/179 |
| 4,703,429 | 10/1987 | Sakata | 364/426 |
| 4,729,104 | 3/1988 | Hara | 123/352 |

FOREIGN PATENT DOCUMENTS 57-191431 11/1982 Japan .

Primary Examiner—Gary Chin
Attorney, Agent, or Firm—Fleit, Jacobson, Cohn & Price

[57] ABSTRACT

A vehicle constant speed control system including a vehicle speed detector and a controller for controlling the engine throttle valve so that the engine output is controlled to make the vehicle speed approach a target speed. The controller compares the actual vehicle speed with the target speed and calculates a required driving torque for driving the vehicle at the target speed and a target throttle valve position which is required for producing the required driving torque. The controller then produces a driving signal to actuate the engine throttle valve so that the required driving torque is produced and the target speed is attained.

27 Claims, 11 Drawing Sheets

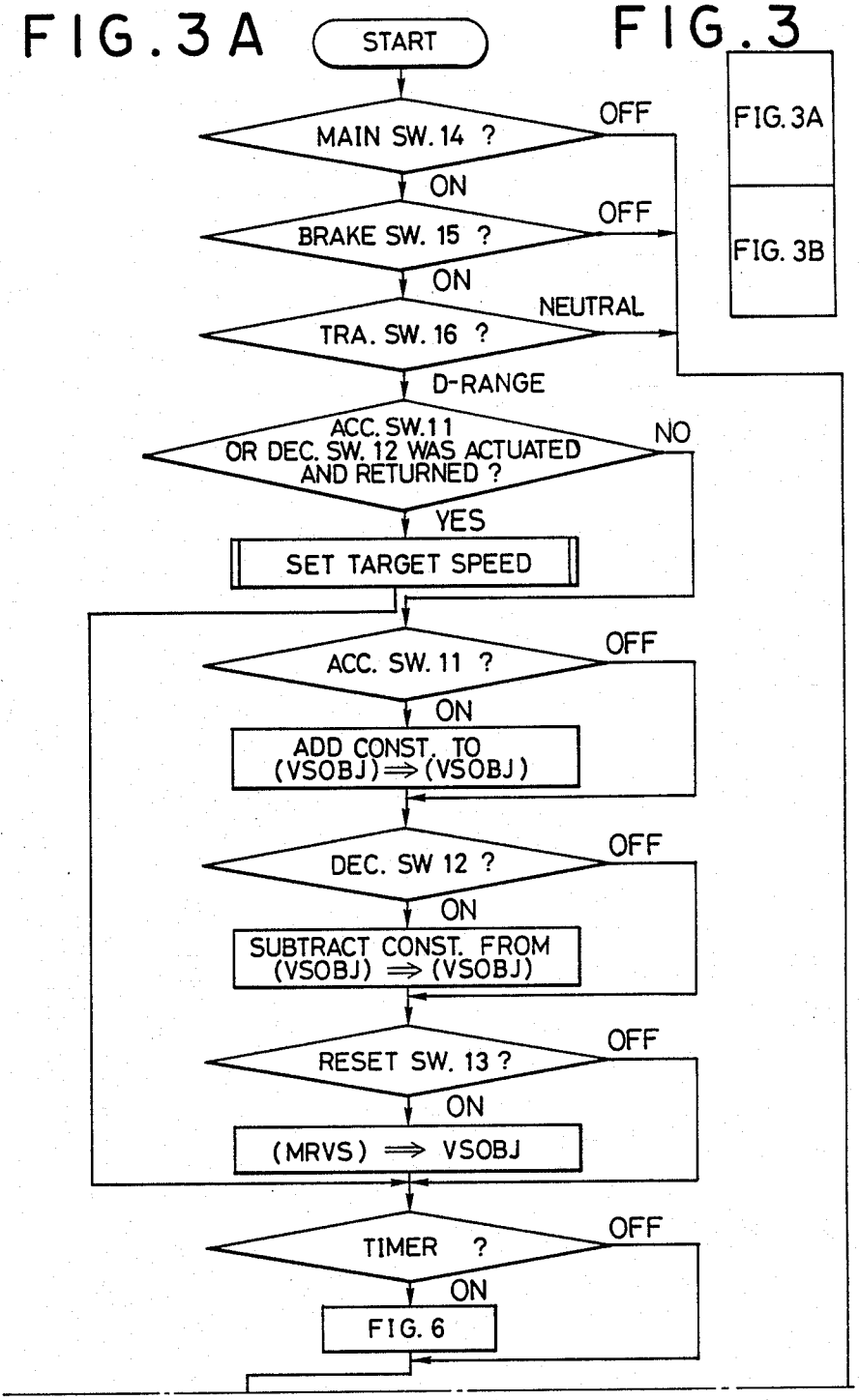

CONSTANT SPEED CONTROL FOR A MOTOR VEHICLE

BACKGROUND OF THE INVENTION

1. Field of the Invention

The present invention relates to a control of a motor vehicle, and more particularly to a constant speed motor vehicle control wherein the motor vehicle is controlled to run under a substantially constant speed.

2. Description of the Prior Art

It has already been proposed to provide a motor vehicle with control means for controlling the engine output so that the vehicle is operated with a substantially constant running speed. For example, the Japanese patent application disclosure No. 57-191431 discloses a vehicle control system including desired speed setting means for setting a desired speed, memory means for memorizing the desired speed and controlling means for controlling the engine throttle valve position in accordance with the difference between the desired speed and the actual speed so that the vehicle speed is controlled to the desired value. In more detail, the engine throttle valve is opened when the actual speed is lower than the desired valve whereas the engine throttle valve opening is decreased when the actual vehicle speed is higher than the desired value.

It should, however, be noted that, even when the difference between the actual speed and the desired speed is the same, the required engine output power for recovering the vehicle speed to the desired value will change depending on the value of the desired speed at which the vehicle is to be operated. Further, the road condition such as the slope of the road on which the vehicle is running and the smoothness of the road as well as the wind condition may also affect the required engine power. The system in the prior art does not however take into account the required engine power for attaining the desired or target vehicle speed.

SUMMARY OF THE INVENTION

It is therefore an object of the present invention to provide a vehicle speed control system in which a desired vehicle speed can be stably and quickly accomplished.

Another object of the present invention is to provide a vehicle speed control system in which a constant vehicle speed can be attained irrespective of the vehicle operating conditions.

Still a further object of the present invention is to provide a constant speed vehicle control system in which required engine output power is determined for controlling the engine throttle valve position to thereby recover the desired speed of the vehicle.

According to the present invention, the above and other objects can be accomplished by a speed control system for a motor vehicle having an engine provided with throttle valve means in intake passage means for controlling intake air flow to the engine, vehicle speed detecting means for detecting an actual speed of the vehicle, target speed setting means for setting a target vehicle speed, speed difference detecting means for detecting a difference between the actual vehicle speed and the target speed for producing a speed difference signal, required torque determining means for determining a required traction torque which is required for establishing the target speed, throttle valve position determining means for determining a position of the throttle valve means required for establishing the required traction torque in accordance with the required traction torque and an output from the vehicle speed detecting means, control means responsive to an output from said throttle valve position determining means for controlling said actuator means so that the throttle valve means is operated to make the actual vehicle speed approach the target speed.

In a case where the required traction torque is determined by taking account of the target speed, the speed difference between the target speed and the actual speed and the vehicle running condition, an effective recovery of the actual vehicle speed to the target speed can be quickly accomplished. According to the features of the present invention, any change in the target speed and the vehicle running condition can be automatically compensated for, so that a reliable speed control can be established.

The above and other objects and features of the present invention will become apparent from the following description of preferred embodiments while referring to the accompanying drawings.

BRIEF DESCRIPTION OF THE DRAWINGS

FIGS. 3, 3A, 3B and 4 are flow charts showing sub-routine of the constant speed control in the embodiment of the present invention;

DESCRIPTION OF THE PREFERRED EMBODIMENTS

Figure 1:
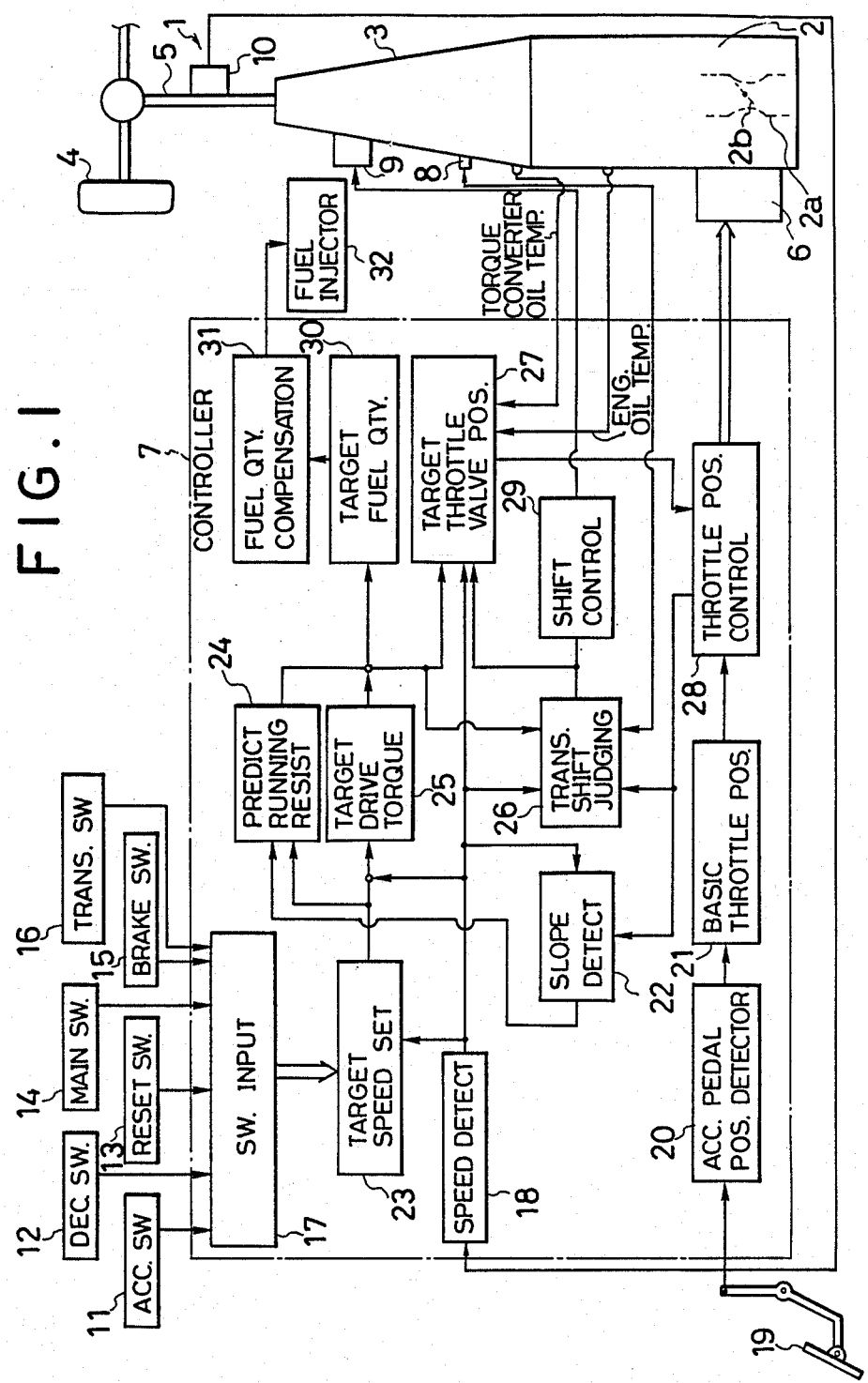
FIG. 1 is a schematic diagram of a vehicle speed control system in accordance with one embodiment of the present invention.

Referring to the drawings, particularly to FIG. 1, there is shown a vehicle 1 having an engine 2 and an automatic transmission 3 which is connected with the engine 2. The transmission 3 has a drive shaft 5 which is connected with the driven wheels 4 of the vehicle 1. The engine 2 includes an intake system having an intake passage 2a which is provided with a throttle valve 2b. A throttle valve actuator 6 is provided on the engine 2 for actuating the throttle valve 2b.

In order to control the vehicle running speed, the vehicle 1 is provided with a controller 7 which may be constituted by a microcomputer which produces a signal for operating the throttle valve actuator 6. The transmission 3 is provided with a gear stage detector 8 which produces a signal indicating the gear position of the transmission 3. The output signal from the detector 8 is applied to the controller 7.

The transmission 3 has an actuator 9 for the shifting operation of the transmission 3. The controller 7 produces a signal for operating the transmission actuator 9. On the drive shaft 5, there is provided a vehicle speed detector 10 which produces signal pulses of a frequency proportional to the vehicle speed. The signal pulses from the detector 10 are also applied to the controller 7. There are further provided an acceleration switch 11, a deceleration switch 12, a reset switch 13, a main switch 14, a brake switch 15 and a neutral switch 16. The acceleration switch 11 is adapted to be actuated when the vehicle speed is to be increased whereas the deceleration switch 12 is actuated when the vehicle speed is to be decreased. The reset switch 13 is actuated when the constant speed control is to be restarted after an interruption. The main switch 14 is for the constant vehicle speed control so that the switch 14 is closed when the constant speed control is to be performed. The brake switch 15 is adapted to be actuated when the vehicle brake is operated to discontinue the constant speed control. The neutral switch 16 is closed when the transmission 3 is in the neutral gear stage so that the constant speed control is discontinued when the transmission 3 is in the neutral stage. the signals from the switches 11, 12, 13, 14, 15 and 16 are applied to the controller 7.

The controller 7 includes a switch signal input circuit 17 for receiving signals from the aforementioned switches. From a functional point of view, the controller 7 can be considered as having functional blocks as shown in FIG. 1. the vehicle speed is calculated based upon the signal pulses from the detector 10. This function is shown by a block designated as a vehicle speed calculating circuit 18.

An accelerator pedal 19 is provided for manually controlling the engine 2. The pedal 19 is provided with a position switch 20 for detecting the position of the pedal 19. The controller 7 receives a signal from the position switch 20 and performs a calculation for obtaining a basic throttle valve position. This function is shown in FIG. 1 as a basic throttle valve position calculating circuit 21.

The controller 7 further functions to determine a target vehicle speed based on the signal from the input circuit 17 and the vehicle speed signal which has been calculated as previously described. This function is shown in FIG. 1 as a target speed setting circuit 23. The target speed thus calculated is used together with the vehicle speed signal to calculate a speed difference signal. The speed difference signal is in turn used to determine a required driving, or traction, torque. This function is shown as a required driving torque calculating circuit 25. The required torque thus calculated is then used to determine a target air-fuel ratio and a target throttle valve position. The functions are shown as a target air-fuel ratio calculating circuit 30 and a target throttle valve position calculating circuit 27, respectively. As shown in FIG. 1, the target throttle valve position calculating circuit 27 is also applied with a signal representing the engine oil temperature or the torque converter oil temperature. The target air-fuel ratio is used to determine a fuel injection quantity and a fuel injector 32 is adjusted to provide a supply of fuel as determined. This function is shown as a fuel injection quantity adjusting circuit 31.

A throttle valve actuating signal is produced based on the basic throttle valve position signal and the target throttle valve position signal, and the throttle valve actuating signal is applied to the throttle valve actuator 6 to actuate the throttle valve 2b. This function is shown as a throttle valve position control circuit 28.

The actual throttle valve position signal is used together with the vehicle speed signal to detect the running condition such as the slope of the road on which the vehicle is running and the wind condition. This function is shown as a slope detecting circuit 22. The target vehicle signal and the running condition signal are used to predict the vehicle running resistance. The function is shown as a running resistance predicting circuit 24. The predicted running resistance is taken into account in determining the target air-fuel ratio and the target throttle valve position. The vehicle speed, the throttle valve position and the target driving torque are used to determine as to whether a gear shifting is necessary. This function is shown as a gear shift judging circuit 26. The information on the gear shifting is taken into account in determining the target throttle valve position. When it is judged that a gear shiftingis necessary, a gear shift signal is produced and applied to the actuator 9. This function is shown as a gear shift control circuit 29.

Figure 2:
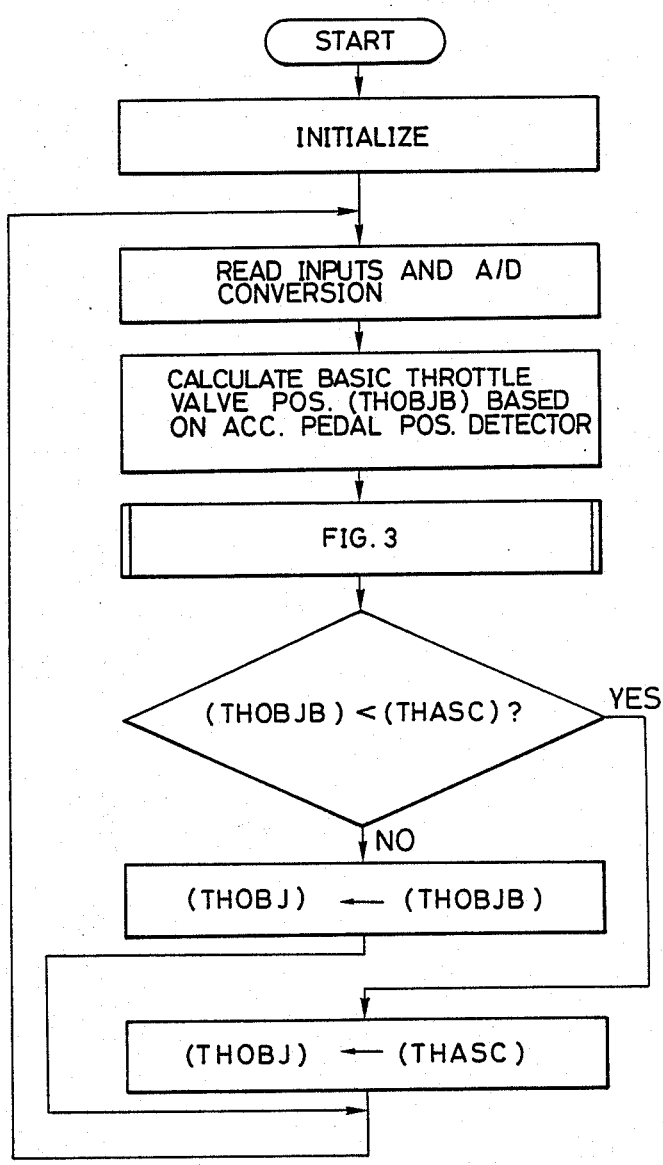
FIG. 2 is a program flow chart showing the main routine of the control.

Referring now to FIG. 2, there is shown a main flow chart in which the controller 7 is at first initialized and the signals are read from the detectors 8,10 and 20 and the switches 11, 12, 13, 14, 15 and 16. If necessary, the signals are converted into digital values. Thereafter, an operation is made to obtain the basic throttle valve position signal THOBJB from the accelerator pedal position detector 20.

Figure 3B:
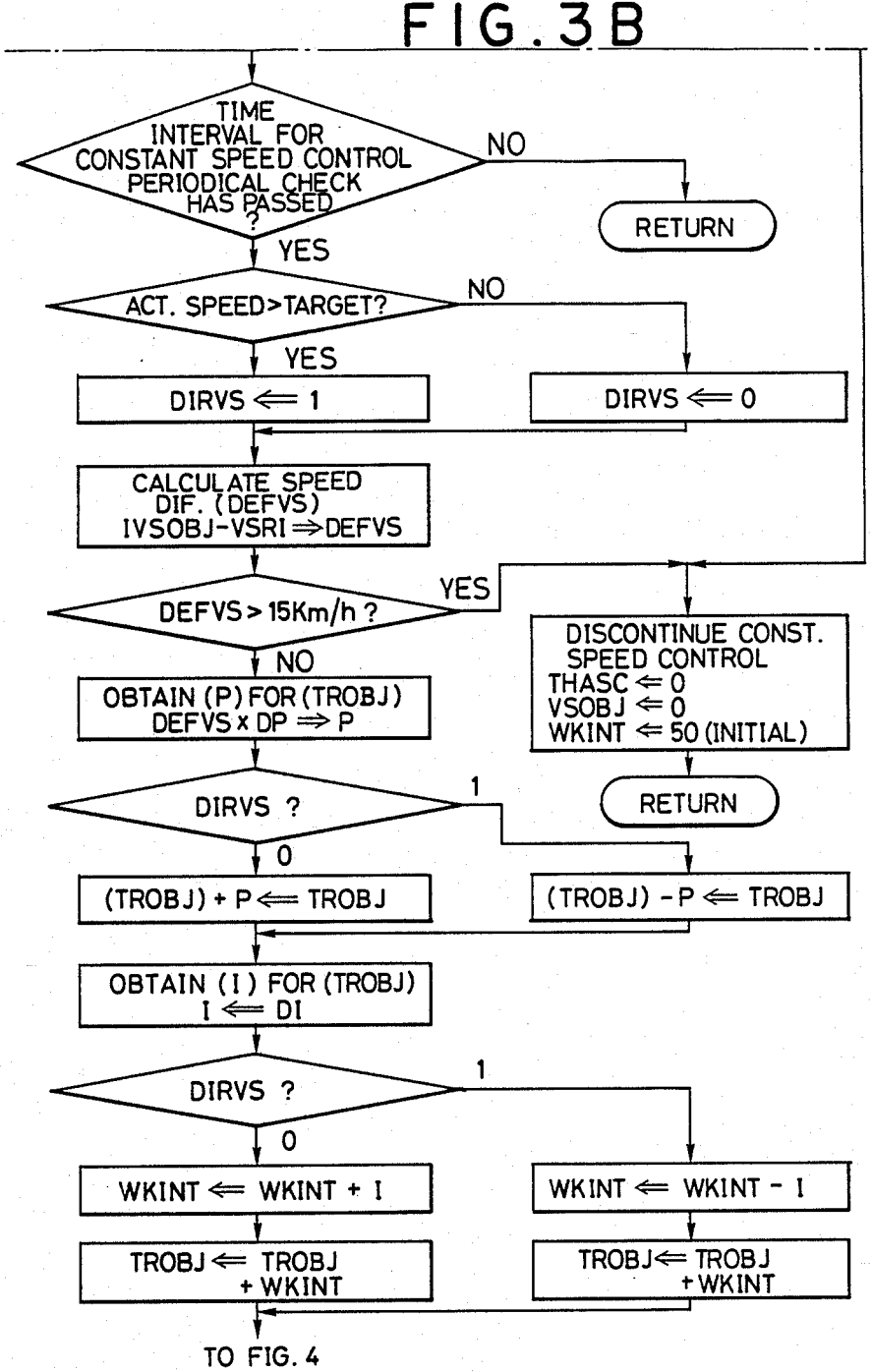
Figure 4:
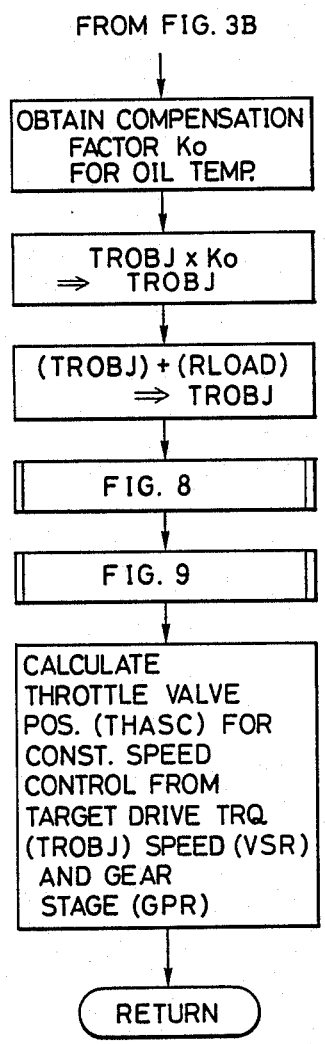

Then, a control is carried out in accordance with the sub-routine as shown in FIGS. 3 and 4 to calculate the required throttle valve position THASC which is required for the constant speed control. The basic throttle valve position signal THOBJB is compared with the required throttle valve position signal THASC and the required throttle valve position signal THASC is selected as the target throttle valve position signal THOBJ when the signal THASC is greater than the signal THOBJB whereas the signal THOBJB is selected as the target throttle valve position signal THOBJ when the signal THOBJB is greater than the signal THASC.

Figure 5:
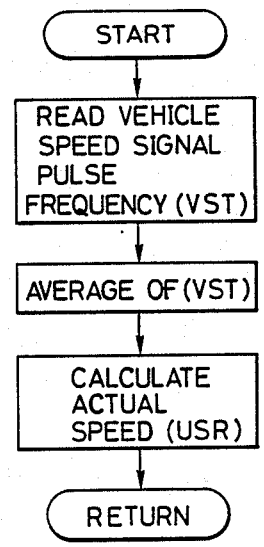
FIG. 5 is a flow chart for the calculation of the actual vehicle speed.
Figure 6:
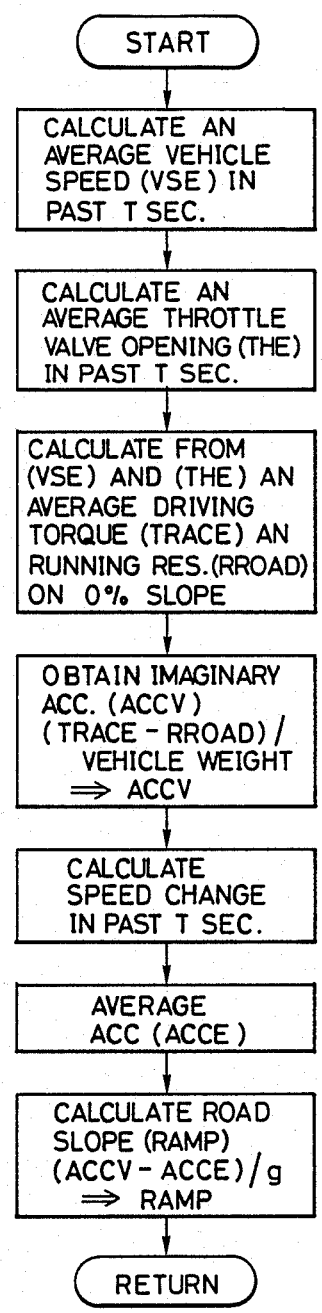
FIG. 6 is a control for calculating the slope of the road on which the vehicle is running.
Figure 7:
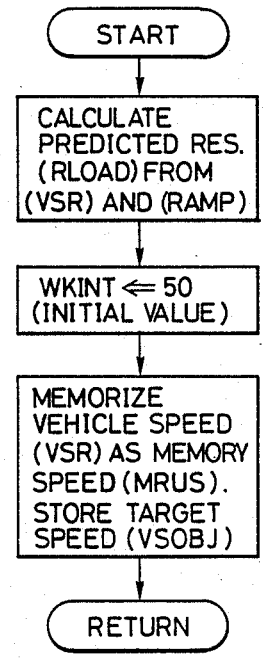
FIG. 7 is a flow chart of the steps for calculating the predicted vehicle running resistance, the target vehicle speed and the memorized vehicle speed.

Referring now to FIG. 3, the constant speed control is performed by the controller 7 when the main switch 14 is closed and the brake switch 15 and the transmission switch 16 are in the positions indicating that the brake is released and the transmission is in one of the running gear stages provided that the switches 11 and 12 are not being actuated. In this condition, the sub-routine as shown in FIG. 7 is carried out to set up the target vehicle speed VSOBJ. More specifically, the controller 7 makes calculations to obtain the predicted running resistance RLOAD based on the actual vehicle speed VSR and the road slope RAMP. The actual vehicle speed is obtained by the routine as shown in FIG. 5 from the signal pulses produced by the speed detector 10. The road slope RAMP is obtained in accordance with the procedure as shown in FIG. 6. In the procedure in FIG. 6, an average vehicle speed VSE is calculated from the vehicle speed signals taken in the past T seconds and an average throttle valve position THE is calculated from the throttle position signals in the past T seconds. Then, calculations are made based on the values VSE and THE to obtain an average driving torque TRACE and the running resistance RROAD on a 0% slope. Thereafter, calculations are made to obtain an imaginary acceleration rate ACCV from the following formula.

ACCV=(TRACE-RROAD)/vehicle weight

Then, calculations are made to obtain a speed change VSD in the past T seconds and an average speed ACCE. Finally, calculations are made to obtain the road slope RAMP from the following formula.

RAMP=(ACCV-ACCE)/acceleration of gravity

Referring back to FIG. 7, an integrating parameter WKINT is set to an initial value. The actual vehicle speed VSR is then memorized as the memory speed MRVS and the vehicle speed as determined by the operator is stored as the target speed VSOBJ.

Referring to FIG. 3, it will be noted that, when the target vehicle speed VSOBJ is determined, the road slope RAMP is calculated for the time period T and the constant speed control is carried out. In the control, the actual vehicle speed is compared with the target speed. If the actual speed is greater than the target speed, the flag DIRVS is set to 1 but when the actual speed is smaller than the target speed, the flag DIRVS is set to 0. Then, a calculation is made to obtain the speed difference DEFVS. When the speed difference is not greater than a predetermined value, for example, 15 km/h, the constant speed control is continued and a proportional factor P is calculated by multiplying a constant DP with the speed difference DEFVS. The position of the flag DIRVS is then read and the factor P is added to the target driving torque TROBJ when the flag is in the 0 position whereas the factor P is subtracted from the target driving torque when the flag is in the 1 position.

Then, a calculation is made to obtain the integrating factor I from the integrating data DI and the factor I is added to the integrating parameter WKINT when the flag DIRVS is in the 0 position and subtracted from the parameter WKINT when the flag is in the 1 position. The target driving torque TROBJ is then modified by adding the recalculated integrating parameter WKINT. Thereafter, the control under the routine in FIG. 4 is carried out.

Referring to FIG. 4, a compensation is made in accordance with the oil temperature, such as the engine oil temperature or the torque converter oil temperature. For this purpose, a calculation is made to obtain the compensation factor Ko in accordance with the engine lubricating oil temperature. The factor Ko is then multiplied with the target driving torque TROBJ to yield a modified target driving torque TROBJ. Then, the final target driving torque TROBJ is calculated based on the predicted running resistance RLOAD which has been obtained from the actual vehicle speed VSR and the road slope.

Figure 8:
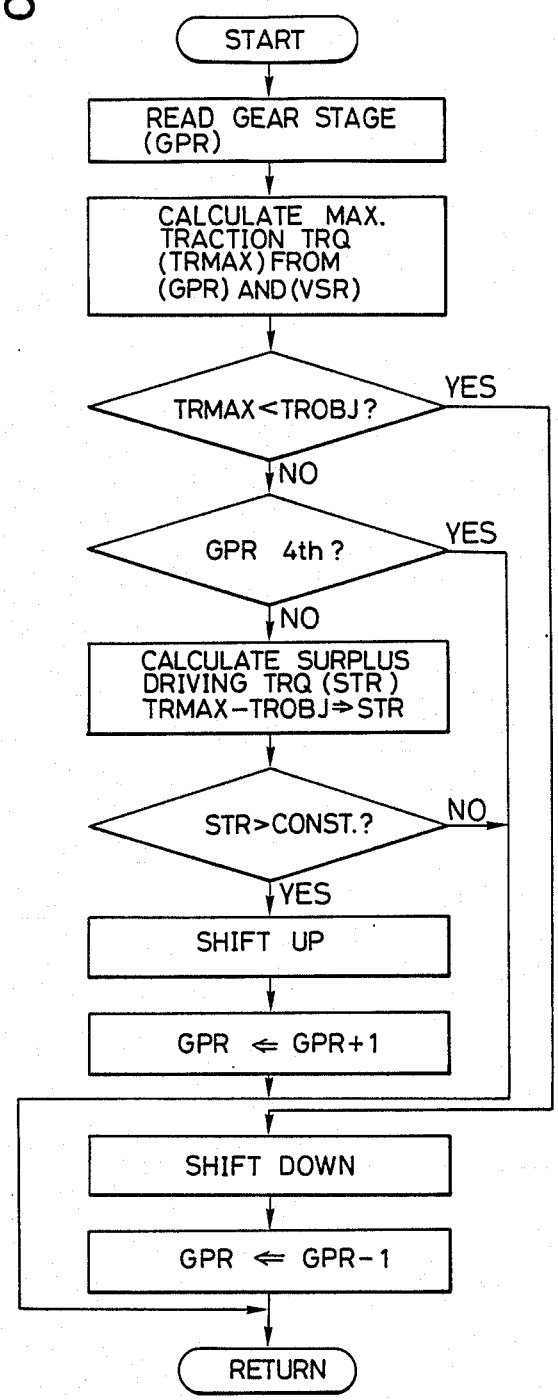
FIG. 8 is a flow chart of a sub-routine for obtaining the most appropriate gear stage for the actual vehicle running condition.

Thereafter, the control procedure in the sub-routine shown in FIG. 8 is carried out to determine the most appropriate transmission gear stage GPR. Referring to FIG. 8, the actual gear stage is detected by the detector 8 and the maximum driving torque is calculated from the signals GPR and VSR. Then, a judgement is made as to whether the target driving torque is greater than the maximum driving torque. If the answer is yes, a shift down signal is applied to the actuator 9 to shift down the gear stage. If the judgement is NO, a further judgement is made as to whether the gear stage is in the highest one, for example, the 4th gear stage. If the answer is YES, a shift down signal is produced to shift down the gear stage. If the answer is NO, a calculation is made to obtain a surplus driving torque STR by subtracting the target driving torque from the maximum driving torque. Then, a judgement is made as to whether the surplus driving torque is greater than the target driving torque. If the answer is NO, a shift down signal is produced to shift down the gear stage. If the answer is YES, a shift up signal is produced to shift up the gear stage.

Figure 9:
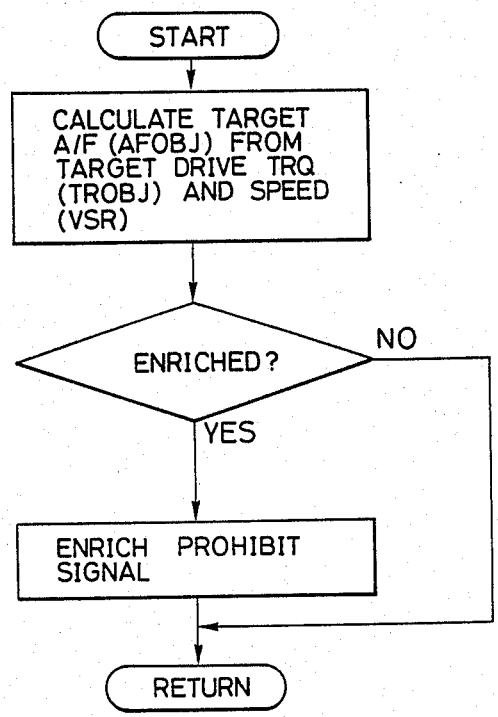
FIG. 9 is a flow chart of a sub-routine for prohibiting a power enriching.
Figure 12:
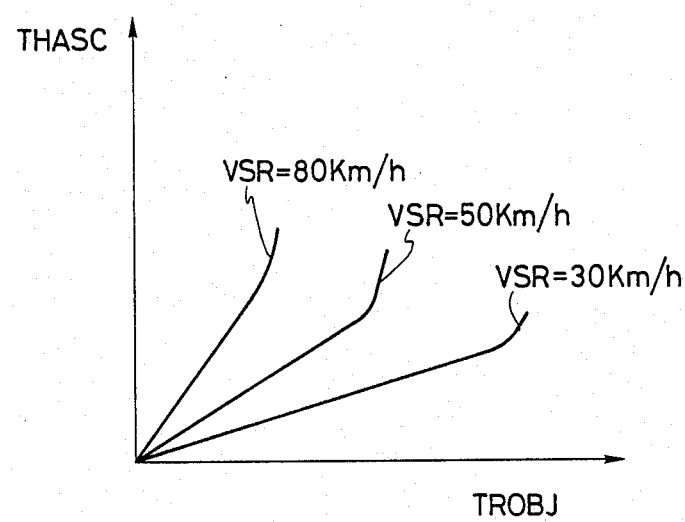
FIG. 12 is a diagram showing the relationship between the target driving torque and the throttle valve position with the vehicle speed taken as a parameter.

Thereafter, the control in the sub-routine as shown in FIG. 9 is carried out. At first, the target air-fuel ratio AFOBJ is calculated from the target driving torque TROBJ and the actual vehicle speed VSR. A judgement is then made as to whether the mixture is enriched. If the answer is NO, the procedure comes to the end. If the answer is YES, an enrich prohibiting signal is produced and applied to the fuel injector. Thereafter, a calculation is made based on the target driving torque TROBJ, the actual vehicle speed VSR and the gear stage GPR to obtain the throttle valve position THASC for continuing the constant speed control, for example, in accordance with the relationship as shown in FIG. 12. Then, the procedure goes back to the main routine to judge as to whether the throttle valve position THASC for the constant speed control is greater than the basic throttle valve position THOBJ. If the valve position THASC is greater than the valve position THOBJ, the former is selected as the target throttle valve position THOBJ. If the latter is greater than the former, the latter THOBJ is selected as the target throttle valve position THOBJ. In the control under the routine in FIG. 3, if the speed difference DEFVS between the target speed and the actual speed is greater than the predetermined value, the constant speed control is discontinued and the values THASC and VSOBJ are set to 0 and the integrating parameter WKINT is returned to the initial value.

When either the acceleration switch 11 or the deceleration switch 12 is actuated, a judgement is made as to whether the acceleration switch 11 is turned off. If the switch 11 is turned off, a further judgement is made as to whether the deceleration switch is turned off. If the switch 12 is turned off, the previously described procedures are carried out. If the switch 11 is turned on, a constant value is added to the target speed VSOBJ every time when the switch 11 is actuated. Similarly, a constant value is subtracted from the target speed VSOBJ every time when the switch 12 is actuated.

Figure 10:
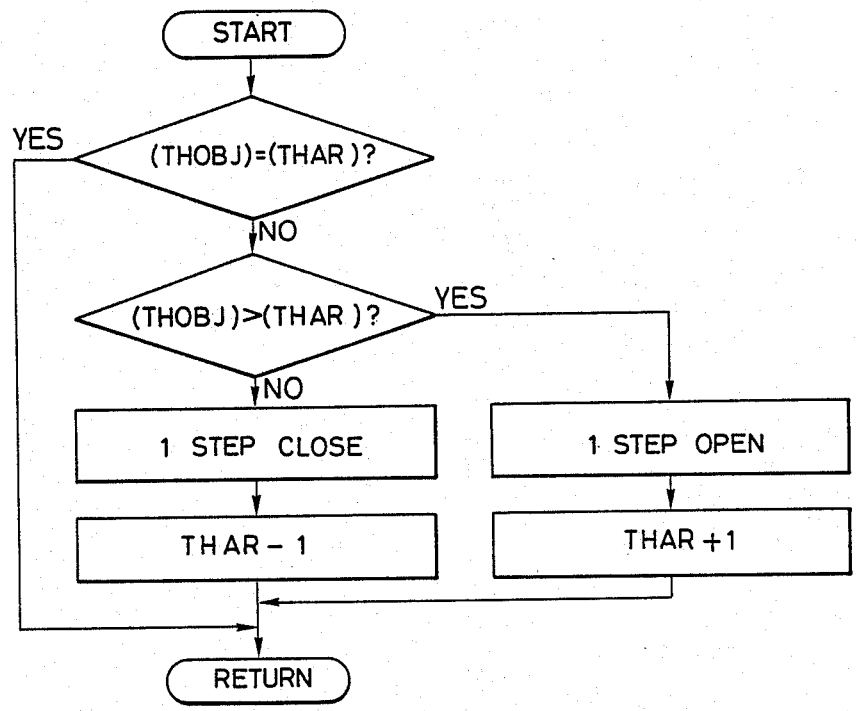
FIG. 10 is a flow chart for the throttle valve position control.

When the target throttle valve position THOBJ is thus determined, the control procedures as shown in FIG. 10 are carried out. At first, the actual throttle valve position THAR is compared with the target position THOBJ and the procedure comes to the end when both the values are the same. If the values are not the same, a judgement is made as to whether the value THOBJ is greater than the value THAR. If the value THOBJ is greater than the value THAR, a one step open signal is produced to actuate the throttle valve actuator 6. If the value THOBJ is smaller than the value THAR, one step close signal is produced to close the throttle valve by one step.

Figure 11:
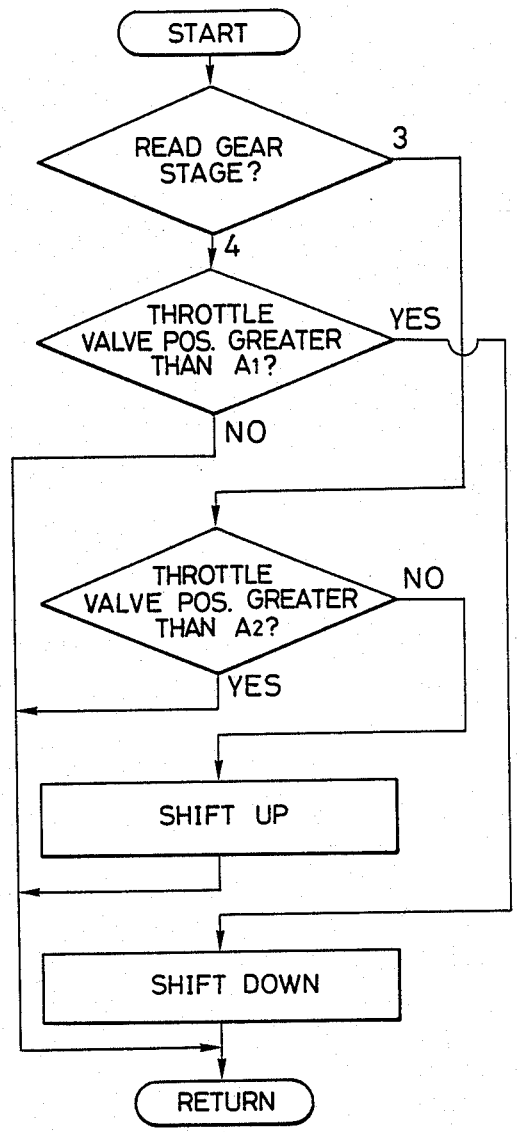
FIG. 11 is a flow chart similar to FIG. 8 but showing another example.

FIG. 11 shows procedures which can be adopted in lieu of the procedures in FIG. 8. In FIG. 11, the gear stage shifting is controlled in accordance with the throttle valve position. At first, the gear stage is detected. When the gear stage is in the 4th stage, a judgement is made as to whether the throttle valve opening is above a predetermined angle $A_1$. If it is judged that the throttle valve is opened beyond the valve $A_1$, it is interpreted that the surplus torque is insufficient and a shift down signal is produced. In case where the throttle valve opening is smaller than the predetermined value, the gear stage is maintained. When the gear stage is in the 3rd stage, a judgement is made as to whether the throttle valve opening is greater than a predetermined value $A_2$. If the throttle valve opening is smaller than the valve $A_2$, it is judged that there is a sufficient surplus torque so that a gear shift up signal is produced. If the throttle valve opening is greater than the predetermined value $A_2$, the gear stage is maintained.

The invention has thus been shown and described with reference to specific embodiments; however, it should be noted that the invention is in no way limited to the details of the described control changes and modifications may be made without departing from the scope of the appended claims.

We claim:

1. A speed control system for a motor vehicle having an engine provided with throttle valve means in intake passage means for controlling intake air flow to the engine, actuator means for actuating said throttle valve means, vehicle speed detecting means for detecting an actual speed of the vehicle, target speed setting means for setting a target vehicle speed, speed difference detecting means for detecting a speed difference between the actual vehicle speed and the target speed and producing a speed difference signal denoting the speed difference between the actual vehicle speed and the target speed, required torque determining means for determining a required traction torque which is required for establishing the target speed in accordance with said speed difference signal, throttle valve position determining means for determining a target throttle valve position of the throttle valve means required for establishing the required traction torque in accordance with the required traction torque and an output from the vehicle speed detecting means, and control means responsive to an output from said throttle valve position determining means for controlling said actuator means so that the throttle valve means is operated to make the actual vehicle speed approach the target speed.

2. A speed control system in accordance with claim 1 in which said vehicle has an automatic transmission having a plurality of gear stages, means being provided for effecting a shifting down operation among said gear stages in the automatic transmission when the required traction torque exceeds a predetermined value.

3. A speed control system in accordance with claim 1 in which said vehicle includes an automatic transmission having a plurality of gear stages, means being provided for effecting a shifting down operation among said gear stages in the automatic transmission when the required traction torque is greater than a first predetermined value.

4. A speed control system in accordance with claim 3 in which the means for effecting a shifting down operation also effects a shifting up operation when said target throttle valve position of the throttle valve means is smaller than a second predetermined value.

5. A speed control system in accordance with claim 1, and further comprising prohibition means for prohibiting fuel enrichment under the constant speed control.

6. A speed control system in accordance with claim 1, and further comprising means for modifying control factors in accordance with an oil temperature, said required traction torque being provided in terms of said control factors.

7. A speed control system in accordance with claim 1, and further comprising slope detecting means for detecting a slope of a road on which the vehicle is running and means for modifying control factors in accordance with the slope detected, said required traction torque being provided in terms of said control factors.

8. A speed control system in accordance with claim 7 in which said slope detecting means detects the slope in accordance with an imaginary acceleration which is obtained from an average driving torque and a running resistance under a 0% slope and an average acceleration which is obtained from a vehicle speed change.

9. A speed control system for a motor vehicle having an engine provided with engine output control means for controlling an output of the engine, actuator means for actuating the engine output control means to control the output of the engine, vehicle speed detecting means for detecting an actual speed of the vehicle, target speed setting means for setting a target vehicle speed, control means for comparing the actual vehicle speed with the target speed to determine a required traction torque which is required for establishing the target speed, for determining a target position of said engine output control means required for establishing the required traction torque in accordance with the required traction torque and an output from the vehicle speed detecting means, and for controlling said actuator means so that the throttle valve means is operated to make the actual vehicle speed approach the target speed.

10. A speed control system in accordance with claim 9 wherein the required traction torque is determined in accordance with a running resistance of the vehicle corresponding to the target speed.

11. A speed control system in accordance with claim 10 further comprising slope detecting means for detecting a slope of a road on which the vehicle is running, the running resistance being determined by taking account of the slope of the road.

12. A speed control system in accordance with claim 9 wherein said vehicle has an automatic transmission having a plurality of gear stages, means being provided for effecting a shifting down operation among said gear stages in the automatic transmission when the required traction torque exceeds a predetermined value.

13. A speed control system in accordance with claim 9 wherein said vehicle has throttle valve means in intake passage means for controlling intake air flow to the engine and an automatic transmission having a plurality of gear stages, and a shifting down operation is made among said gear stages in the automatic transmission when a throttle valve position of the throttle valve means is greater than a predetermined value.

14. A speed control system in accordance with claim 9 wherein said vehicle has an automatic transmission having a plurality of gear stages, means being provided for effecting a shifting up operation among said gear stages in the automatic transmission when the required traction torque is smaller than a predetermined value.

15. A speed control system in accordance with claim 9 wherein said vehicle has throttle valve means in intake passage means for controlling intake air flow to the engine and an automatic transmission having a plurality of gear stages, and a shifting up operation is made among said gear stages in the automatic transmission when a throttle valve position of the throttle valve means is smaller than a predetermined value.

16. A speed control system in accordance with claim 9 wherein said vehicle has throttle valve means in intake passage means for controlling intake air flow to the engine and an automatic transmission having a plurality of gear stages, and gear stage detecting means is provided for detecting a gear stage being currently selected, an output of said gear stage detecting means being employed for determining a target throttle valve position of the throttle valve means.

17. A speed control system for a motor vehicle having an engine, engine output control means provided with a control member movable so as to change an output of the engine, vehicle speed detecting means for detecting an actual speed of the vehicle, target speed setting means for setting a target vehicle speed, speed difference detecting means for detecting a speed difference between the actual vehicle speed and the target vehicle speed, first calculating means for determining a first control factor in response to the speed difference, second calculating means for determining a second control factor corresponding to a running resistance of the vehicle, position determining means for calculating a control value corresponding to a required traction torque for establishing the target vehicle speed based on said first and second control factors to determine a position of said control member in accordance with the control value, and actuator means connected with said engine output control means for controlling a position of the engine output control means to thereby control the output of the engine.

18. A speed control system in accordance with claim 17 further comprising slope detecting means for detecting a slope of a road on which the vehicle is running, the second control factor being determined by taking account of an output of said slope detecting means.

19. A speed control system in accordance with claim 18 wherein the vehicle has an automatic transmission having a plurality of gear stages, said position determining means being adapted to determine the position of the control member based on a gear stage currently selected in the automatic transmission and the actual vehicle speed.

20. A speed control system in accordance with claim 17 wherein said vehicle has an automatic transmission having a plurality of gear stages, means being provided for effecting a shifting down operation among said gear stages in the automatic transmission when the required traction torque exceeds a predetermined value.

21. A speed control system in accordance with claim 17 wherein said vehicle has throttle valve means in intake passage means for controlling intake air flow to the engine and an automatic transmission having a plurality of gear stages, and a shifting down operation is made among said gear stages in the automatic transmission when a throttle valve position of the throttle valve means is greater than a predetermined value.

22. A speed control system in accordance with claim 17 wherein said vehicle has an automatic transmission having a plurality of gear stages, means being provided for effecting a shifting up operation among said gear stages in the automatic transmission when the required traction torque is smaller than a predetermined value.

23. A speed control system in accordance with claim 17 wherein said vehicle has throttle valve means in intake passage means for controlling intake air flow to the engine and an automatic transmission having a plurality of gear stages, and a shifting up operation is made among said gear stages in the automatic transmission when a throttle valve position of the throttle valve means is smaller than a predetermined value.

24. A speed control system in accordance with claim 17 further comprising accelerator pedal means provided in said vehicle, accelerator detecting means for detecting a position of said accelerator pedal means, second position determining means for determining a position of said control member corresponding to the position of the accelerator pedal means, and control means for comparing a first position signal from the control member obtained based on a stroke of the accelerator pedal means with a second position signal from the control member obtained based on said control value to actuate said actuator means to move the control member to the first position of the control member when the second signal has a value smaller than a value of the first position signal.

25. A speed control system in accordance with claim 17 further comprising accelerator pedal means provided in said vehicle, accelerator detecting means for detecting a position of said accelerator pedal means, second position determining means for determining a position of said control member corresponding to the position of the accelerator pedal means, said actuator means being actuated to move the control member to the position of said control member corresponding to the position of the accelerator pedal means under a vehicle operating condition other than a constant vehicle speed control, and to move the control member to the position determined in accordance with the control value under the constant vehicle speed control.

26. A speed control system for a motor vehicle in accordance with claim 17 wherein said vehicle has an automatic transmission having at least two different gear stages including a lower gear stage and a higher gear stage, surplus torque finding means for finding a shortage in a surplus torque of the engine when the higher gear stage is selected and the output of the engine is controlled in accordance with a constant vehicle speed control, and for producing a shifting down signal when said shortage in surplus torque is found, and shift down means for receiving the shifting down signal to effect a shifting down operation in the automatic transmission.

27. A speed control system in accordance with claim 26 in which said output of the engine is controlled by throttle valve means and said surplus torque finding means finds the shortage of the surplus torque of the engine when a position of the throttle valve means is greater than a predetermined value.

* * * * *